Aug. 10, 1954 — M. E. JORDAN — 2,686,107
PROCESS OF MAKING NONSCORCHING CARBON BLACK
Filed Oct. 23, 1948
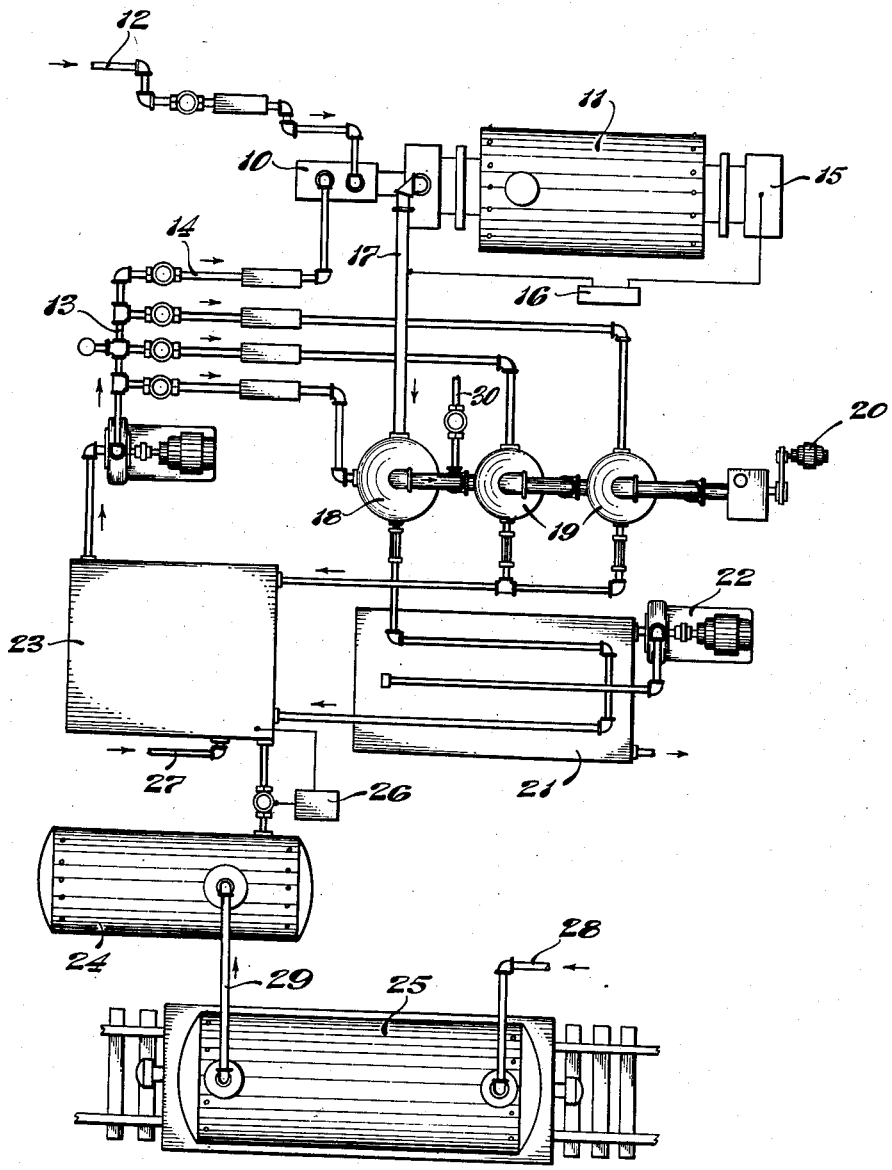
INVENTOR.
Merrill E. Jordan
BY Patented Aug. 10, 1954

2,686,107

UNITED STATES PATENT OFFICE 2,686,107

PROCESS OF MAKING NONSCORCHING CARBON BLACK

Merrill E. Jordan, Walpole, Mass., assignor to Godfrey L. Cabot, Inc., Boston, Mass., a corporation of Massachusetts Application October 23, 1948, Serial No. 56,092

3 Claims. (Cl. 23—209.1)

This invention relates to carbon black products and more particularly to fine furnace carbon black for compounding in rubber and to processes of manufacturing the same. In one aspect this invention is an improvement over the process and product disclosed and claimed in the copending application of C. A. Stokes and myself Serial No. 40,186 filed July 22, 1948, now abandoned in favor of the present application.

Fine furnace (FF) carbon blacks are carbon blacks made by the furnace process which have a mean particle diameter of less than 45 millimicrons. Such carbon blacks closely resemble the easy processing channel (EPC) carbon blacks in such respects as particle size, surface area, color properties and rubber reinforcing qualities and could be used interchangeably with the EPC blacks in otherwise identical rubber compounds were it not for their undesirable curing properties. When a FF black is compounded with the usual organic accelerated natural rubber formulae it tends to cause precure or scorch during the sequence of processing operations preceding the final curing step, making its use in rubber compounds difficult, expensive and at times impossible because of the rubber becoming stiff and lumpy. Furthermore, even if the FF black is satisfactorily compounded in a standard rubber batch without scorching the subsequent vulcanization may proceed too rapidly, resulting in an inferior rubber product of excessive hardness and seriously deficient in strength due to over-cure.

As explained in the above mentioned application we found that we are able to make FF carbon black non-scorching by increasing the volatile content of the black, normally between .5 and .8% as first produced, to from 1 to 3% by treating the black, in either fluffy or pellet form, with the vapors of certain oxidizing agents. In the present specification the term "volatile content" is used, as is customary in the carbon black industry to mean the chemically combined oxygen and hydrogen present on the surface and in the interior of the carbon black particles and which may be driven off by heating the carbon black for a short time at approximately 1750° F. The constituents so driven off are identified chiefly as CO, $CO_2$ and $H_2$.

It is well known to those skilled in the art that the curing behavior of any given carbon black in a rubber compound may be accurately forecast by determining its diphenylguanidine adsorption; i. e. the percentage of diphenylguanidine (DPG) removed by a given sample of black from a .001 N solution of DPG in benzene. For example, a fine furnace black having a DPG adsorption of less than 10% is very fast curing and scorchy whereas a black with a DPG adsorption of substantially over 10% will slow the rate of curing of the rubber in which compounded and will not cause scorch. Rubber grade channel carbon blacks and fine furnace blacks with volatile contents in excess of 1% have a DPG adsorption of substantially more than 10%, i. e. around 35%, and will not cause scorch. The following table illustrates the relative DPG adsorption values (1) for Spheron 9, an EPC black with a mean particle size of 33 millimicrons, (2) for Sterling 105, a FF black with a mean particle size of 39 millimicrons, and (3) for Vulcan, a high structure FF black made from liquid hydrocarbons with a mean particle size of 31, millimicrons before and after increasing the volatile contents of the FF blacks. It will be noted that treated Sterling 105 with a volatile content of only 1.75% has a DPG adsorption of 40% as compared to Spheron 9 with a DPG adsorption of 36% and a volatile content of 5%.

Table I

| Type of Black | DPG Adsorption (Percent) | Percent Volatile Content |
|---|---|---|
| Spheron 9 | 36 | 5 |
| Sterling 105 | 8 | 0.5 |
| Treated Sterling 105 | 40 | 1.7 |
| Vulcan | 9 | 0.8 |
| Treated Vulcan | 35 | 2 |

Further tests of the treated blacks have been conducted by compounding them in rubber. For example, in a standard natural rubber test recipe of:

|  | Parts |
|---|---|
| Smoked sheet | 100 |
| Carbon black | 50 |
| Zinc oxide | 5 |
| Sulphur | 2.8 |
| Agerite (Hipar) | 1 |
| Stearic acid | 3 |
| Pine tar | 3 |
| Mercaptobenzothiazole | [1] 0.5 |

[1] 0.9 for Spheron 9.

The rubbers containing Spheron 9 and Vulcan treated with nitric acid vapor to a volatile content of 2%, had almost identical scorch points, 19 minutes in the case of Spheron 9 and 17 minutes in the case of Vulcan, and both reached a state of cure in 25 minutes. Furthermore, the characteristics of the rubber in which the two blacks were compounded were substantially similar as shown by the following comparative test results:

*Table II*

|  | Treated Vulcan | Spheron 9 |
|---|---|---|
| 300% Modulus p. s. i | 1,500 | 1,630 |
| 400% Modulus p. s. i | 2,310 | 2,410 |
| Optimum Tensile | 3,550 | 4,030 |
| Percent Elongation | 500 | 560 |
| Shore Hardness | 68 | 68 |
| Abrasion Resistance, Volume Index | 202 | 273 |
| Rebound Percent RE | 67.2 | 69.3 |
| Tors. Hysteresis (100° C.) | .158 | .199 |
| T-50 (° C.) 60' | −7 | −12 |
| Tear Res. (#/in av. 30' and 90' cures) | 600 | 550 |
| Mooney Viscosity (ML 4'/212° F) | 82 | 77 |

Because carbon black as first produced is light, flocculent, adherent and dusty it is common practice in the industry, whenever possible, to agglomerate or pelletize the black, either with or without the addition of a binder, such as water, by turbulent agitation in a confined space. One convenient method of wet pelletization is disclosed in U. S. Letters Patent No. 2,167,074, Offutt. The black treated by vapor phase oxidation in accordance with the process disclosed in the said copending application may readily be pelletized after treatment or the black may be treated after having been pelletized. In either event, however, two separate operations must be performed necessitating additional work and expense.

It is the principal object of my invention to provide a method of treating FF carbon black to make it non-scorching while converting it to pellet form in one and the same operation.

It is also an object of my invention to provide a FF carbon black product which is in the form of discrete, tenacious free-flowing and substantially dustless pellets and which will be non-scorching when used in rubber compounds.

I have found that I can produce a scorch-free fine furnace carbon black in the form of pellets suitable for bulk handling by adding to the pelletizing water a small amount of a water-soluble oxidizing agent. As the flocculent furnace carbon black is agglomerated I have found that it will also pick up volatile matter from the oxidizing agent in solution with the water. Since it is desirable to add only about 1-2% volatile matter to the black only enough of the oxidizing agent is added to the water to achieve the desired result. The amount added will of course depend upon the concentration of the oxidizing agent, the total amount of the liquid required and the length of time necessary to make satisfactory pellets.

After the pelletization treatment has been completed the pellets must be dried. Also injurious residues and volatile by-products from the oxidation which are occluded on the carbon black as a result of the treatment, and which occur principally as free gases, must be removed. This is accomplished by the application of heat not in excess of 650° F. to the pellets after the preliminary drying operation in conjunction with the passage of air or any inert gas through the treated black to carry away these free gases liberated from the black.

The oxidizing agent which has been found to be particularly effective in carrying out the process of my invention is nitric acid. However, other oxidizing agents are equivalent and may be used with equal effect, for example, hydrogen peroxide and the other peroxides, sodium hypochlorite and other hypochlorites, potassium bichromate and the other bichromates and potassium permanganate and the other permanganates. Whatever oxidizing agent or combination thereof is used it is only necessary, as I have said, to add a sufficient amount to the pelletizing water so that the carbon black pellets will have the desired volatile content, preferably not substantially in excess of 3%.

The process of my invention will be best understood and appreciated by reference to the accompanying drawing comprising a diagrammatic flow sheet illustrating apparatus which may advantageously be employed in carrying out my novel process, although it will be understood that the process is not restricted to this or any specific type of apparatus.

The illustrated apparatus includes a stainless steel wet pelletizer 10 and stainless steel drum drier 11, each of which may be of conventional design. Means for driving the pelletizer and rotating the drier drum, for heating the drum and for passing air or other inert gas through drier are provided but not shown.

The flow system includes a water supply line 12 and a treating solution supply manifold 13 with appropriate connections 14 running into the pelletizer 10. Although one pelletizer and one drier are shown two or more of each connected in parallel, may be employed. Direct connection between pelletizer 10 and drier 11 is provided so that as the pellets are formed they pass directly into the drier. Butterfly valves (not shown) are provided in the outlet end 15 of the drier 11 operated by a vacuum controller 16.

A stainless steel duct 17 leads from the pellet inlet end of the drier 11 to a cooling tower 18 through which pass the free gases driven from the pellets during the heating operation. Cooling of these gases is effected by a spray (not shown) of recycled treating solution. Scrubbing towers 19 are provided to remove the various vapors separated in the cooling operation and to clean them for release to the atmosphere through an exhauster 20. The treating solution recovered from the cooling tower may be cooled by passing through a heat exchanger 21 equipped with a recirculating pump 22. A recovery tank 23 is provided to serve as a reservoir for solution recovered from cooling tower 18 and scrubbing towers 19 and for fresh solution drawn from the original supply in a tank 24, which in turn may be supplied from a tank car 25. Fresh solution is provided as needed from the tank 24, which may be of aluminum, the flow being automatically controlled by an automatic controller 26. Water as needed to dilute the solution to the desired strength may be supplied through pipe 27 leading to the tank 23. The solution can be unloaded from the tank car 25 by gravity flow when possible, or any other suitable means. One convenient method is illustrated in which air from an air line 28 provides the pressure to cause the solution to flow from the tank car 25 through hose 29 into tank 24.

In practicing the process of my invention with nitric acid of between 5 and 25% concentration (by weight) as the treating solution and GP-645, a high structure FF black practically identical with Vulcan, as the black being treated, a charge of fluffy black is placed in the pelletizer 10 which is then set in operation to effect agitation of the carbon black. Water and nitric acid are simultaneously introduced through pipes 12 and 14 respectively, the rate of flow being adjusted so that the desired acid concentration may be obtained and maintained in the pelletizing mix and so that the optimum total amount of liquid will have been added by the time pelletization is completed, for example 40–100% of the weight of the dry carbon black. After pelletization has been completed, which may be within 30–45 minutes, the supply of water and acid is cut off, the pelletizer stopped and the wet pellets transferred to the drier 11.

Although I have thus far described the process as a batch process, it may operate as a continuous process as when a pin type pelletizer such as that described in U. S. Letters Patent #2,306,-698, Heller et al., is used. In such apparatus the black is moved along while being agglomerated and remains in the agitation zone long enough to be formed into pellets and be wetted with the desired amount of water and acid, for example, 40–60% of the weight of dry carbon black.

As shown in the accompanying diagram the pelletized black may be made to flow from the pelletizer 10 into the drum drier 11 where it first is dried near the inlet end at temperatures in the range of 250–300° F. The drier 11 is slightly inclined downward toward the outlet end 15 and the black pellets tend to be slowly shifted in that direction as the drum rotates. Higher temperatures prevail in the middle and near the outlet end of the drum and it is necessary to maintain the black at temperatures of between 600° and 650° F. for at least about ½ hour in order to remove the free gases which are then carried off in the air flow of about 6–6.5 cu. ft./hr. To carry the free gases away vacuum is applied to the discharge end of duct 17 so that air is drawn into the drum through outlet end 15. To control the flow of air, or other inert gas if used, in place of air, a butterfly valve (not shown) actuated by vacuum controller 16 is positioned in the outlet end 15 of the drier.

While the black pellets are undergoing degassing the gaseous vapors being driven off enter duct 17 at temperatures of between 250 and 350° F. and pass into cooling tower 18 where they are cooled to about 100° F. by a spray of weak recycled nitric acid, in the order of about 7%. In being cooled the vapors will condense the major portion of the water used for pelletizing and in addition some part of the nitric acid will be absorbed into the cooling spray. Nitric oxides, water vapor, some oxygen and inert gases will pass out of the top of the cooling tower 18 and into the scrubbing towers 19. In the scrubbing towers enough air may be added through a pipe 30 to oxidize the nitric oxides to higher oxides of nitrogen which will be absorbed in the towers. The oxygen and inert gases remaining will then be carried off to the atmosphere through the exhauster 20.

Considerable water and nitric acid will be recovered in the cooling tower 18. Mixed with the spray acid the fluid from the tower will flow by gravity into the heat exchanger 21 where all will be cooled to about 200 to 100° F. and delivered to the acid recovery tank 23. There fresh acid and water will be added and the supply of acid solution maintained for supplying the pelletizer 10 as needed.

It is evident that the process of my invention permits of a wide variety of controls over the resulting product. As a certain amount of time is required to pelletize any given carbon black, control over the amount of volatile matter added to the black is easily maintained by varying the concentration of the treating solution. For example, when nitric acid is used a greater concentration of the acid will result in a greater amount of volatile matter being added to the black, as will be noted from the table.

*Table III*

NITRIC ACID PELLETIZATION OF GP-645

| Run No. | HNO₃ Conc. (percent) | HNO₃/lb. Black | ASTM Vol. (percent) (Before degassing) | Percent free acid (as HNO₃) (before degassing) | pH (before degassing) |
|---|---|---|---|---|---|
| 1 | 25 | 0.138 | 4.9 | 1 | 1.5 |
| 2 | 10 | 0.059 | 2.74 | 0.31 | 2.7 |
| 3 | 5 | 0.031 | 1.96 | 0.15 | 2.5 |

AFTER DEGASSING AT 600° F. FOR 1 HR.

| Run No. | ASTM Vol. (Percent) | Percent Free Acid | pH |
|---|---|---|---|
| 1 | | | |
| 2 | 2.50 | 0.06 | 3 |
| 3 | 1.95 | 0.06 | 2.9 |

GP-645 is a fine furnace carbon black almost identical with Vulcan, made from liquid hydrocarbons and having a mean particle diameter of 30 millimicrons, a surface area of 117 sq. m./gm. and a color (Nigrometer index) of 90.

It is apparent, then, that over the range of variables there occurs a very nearly linear dependency of volatile added upon the concentration of nitric acid in the pelletizing solution and the total acid to total black weight ratio. By plotting a curve for total volatile added against concentration of acid it has been found that there is an increase in volatile content of the black of 0.15% for each additional 1% in acid concentration between the concentration limits of 5 and 25%. Similarly there is an added 1% in volatile content of the black for each rise of 0.036 lb. of 100% HNO₃ per lb. of black charged. Thus I conclude that a nitric acid concentration of about 7.5% by weight is close to the optimum for obtaining a fine furnace black with a volatile content in the optimum range of 2–3%. Similar relationships have also been noted when the other oxidizing agents mentioned above have been used to treat the black.

For example, assuming that the process is started with flocculent carbon black in the pelletizer 10 having an initial volatile content of 0.5 to 0.8% and that the oxidizing liquid is added over a period of 40 minutes in a concentration of 7.5% and in amount 80% of the weight of the dry carbon black; it will be apparent that the volatile content of the carbon black begins at once to increase and continues to increase during the whole period of agitation in which the carbon black is converted to pelletized form. The wet pellets are then transferred to the drier 11 and the increase in volatile content is definitely and finally terminated within the optimum range of 2 to 3% by degassing the drying pellets through the withdrawal of all free gases by the duct 17 as above explained.

As in the case of black treated with HNO₃ in the vapor phase the black pellets treated in accordance with the process of my invention possess practically the same scorch and cure characteristics in rubber compounds as does Spheron 9.

The following comparison between Spheron 9 and GP–645 pelletized with 7% HNO₃ to a volatile content of 1.82% and degassed for thirty minutes at 600° F. to a free acid content of 0.038%, each compounded in accordance with a standard natural rubber recipe set forth above, is illustrative; Example 4:

|  | Treated GP-645 | Spheron 9 |
|---|---|---|
| 300% Modulus | 1,320 | 1,440 |
| 400% Modulus | 2,080 | 2,265 |
| Tensile | 3,125 | 4,050 |
| Elongation, Percent | 560 | 620 |
| Hardness | 65 | 64 |
| T-50 (60′) 300% | −3.8 | −11.1 |
| Scorch Tests: |  |  |
| ML 1′/250° F | 62 | 62 |
| ML 4′/250° F | 58.5 | 57 |
| minimum viscosity | 57 | 56 |
| time to scorch point | 22′ | 21′ |
| time to cure point | 27′40″ | 27′30″ |

When the treatment has been continued for the desired period of time and under the desired conditions the treated carbon black will be found to have a volatile content of between 1 and 3% according to the concentration of the acid-water solution and acid-black ratio. The resulting carbon black product will behave in rubber in substantially the same manner as will the black treated in accordance with the process described in the said copending application.

Having thus described the process of my invention and the novel and useful product thereof, I claim as new and desire to secure by Letters Patent:

1. A process of making furnace carbon black non-scorching in rubber compounding and converting it into free-flowing dustless pellets in one and the same operation, which is characterized by the steps of agitating flocculent furnace carbon black having a volatile content of about 0.5% while adding thereto a 7.5% aqueous solution of nitric acid in an amount 80% of the weight of the carbon black, thereby increasing the volatile content of the carbon black and at the same time converting it into the form of discrete wet pellets, then terminating the increase of volatile content in the carbon black pellets at 3% by drying the wet pellets and removing free nitric oxides therefrom by heating to a temperature of 250° to 650° F. while causing air to flow through them.

2. A process of making furnace carbon black non-scorching in rubber compounding and converting it into free-flowing dustless pellets in one and the same operation, which is characterized by the steps of agitating flocculent furnace carbon black having an initial volatile content of 0.5% to 0.8% while adding thereto an aqueous solution of nitric acid in the amount between 40 and 100% of the weight of the dry furnace carbon black and constituting 0.031 to 0.138 lb. of nitric acid per pound of carbon black, thereby increasing the volatile content of the carbon black and at the same time converting it into the form of discrete wet pellets, and then terminating the increase of volatile content in the carbon black at 1 to 3% by drying the wet pellets and removing free nitric oxides therefrom by heating to a temperature of 250° to 650° F. while causing air to flow through them.

3. A process of making furnace carbon black non-scorching in rubber compounding and converting it into free-flowing dustless pellets in one and the same operation, which is characterized by the steps of agitating flocculent furnace carbon black having an initial volatile content of 0.5% to 0.8% while adding thereto an aqueous solution containing 5 to 25 per cent by weight of nitric acid in an amount between 40 and 100% of the weight of the dry furnace carbon black, thereby increasing the volatile content of the carbon black and at the same time converting it into the form of discrete wet pellets, and then terminating the increase of volatile content in the carbon black at 1 to 3% by drying the wet pellets and removing free gases from the dried pellets by heating to a temperature of 250° to 650° F.

References Cited in the file of this patent

UNITED STATES PATENTS

| Number | Name | Date |
|---|---|---|
| 2,210,763 | King et al. | Aug. 6, 1940 |
| 2,213,059 | Teegerstrom | Aug. 27, 1940 |
| 2,420,810 | Bray et al. | May 20, 1947 |
| 2,439,442 | Amon et al. | Apr. 13, 1948 |
| 2,479,708 | Amon | Aug. 23, 1949 |

OTHER REFERENCES

Mantell, "Industrial Carbon," 2nd ed. (1946), pages 60–66; D. Van Nostrand Co., N. Y. C.

Drogin, "Developments and Status of Carbon Black," United Carbon Co., Inc., Charleston, W. Va. (1945), pages 50, 90, 99, 103.

Drogin et al., "Today's Furnace Blacks," United Carbon Co., Inc., Charleston, W. Va. (1948), pages 36–37, 40.

Johnson, "Ind. and Eng. Chemistry," vol. 21, No. 12 (1929), pages 1288–1290.

Sweitzer et al., "The Rubber Age," vol. 55, No. 5, August 1944, pages 469–478.

Braendle et al., "India Rubber World," vol. 119, No. 1, New York, October 1948, pages 57–62.